US005943997A

United States Patent [19]

Kinsey et al.

[11] Patent Number: 5,943,997

[45] Date of Patent: Aug. 31, 1999

[54] EVAPORATIVE EMISSIONS CONTROL FOR CARBURETORS

[75] Inventors: Dan L. Kinsey, LaFarge; Scott A. Sjovall, Westby; Brian W. Perkins, Blue River; Robert A. Griswold, Richland Center, all of Wis.

[73] Assignee: S&S Cycle, Inc., Viola, Wis.

[21] Appl. No.: 09/020,135

[22] Filed: Feb. 6, 1998

[51] Int. Cl.[6] .......... F02M 37/04; B01D 47/00

[52] U.S. Cl. .......... 123/516; 123/337; 261/DIG. 67

[58] Field of Search .......... 123/516, 517, 123/179.1, 518, 337, 339.14; 261/DIG. 67, 72.1, 72.2, 121.4

[56] References Cited

U.S. PATENT DOCUMENTS

| | | | |
|---|---|---|---|
| 1,395,950 | 11/1921 | Earl | 261/DIG. 67 |
| 1,999,517 | 4/1935 | Prentiss | 261/DIG. 67 |
| 2,269,704 | 1/1942 | Berry | 123/339.14 |
| 2,557,111 | 6/1951 | Jorgenson | 261/DIG. 67 |
| 2,965,086 | 12/1960 | Gregory | 123/517 |
| 3,043,286 | 7/1962 | Blomberg | 123/339.14 |
| 3,368,326 | 2/1968 | Heruert | 261/DIG. 67 |
| 3,548,797 | 12/1970 | Hagihara | 261/DIG. 67 |
| 3,554,175 | 1/1971 | Sarto . | |
| 3,744,471 | 7/1973 | Braun et al. . | |
| 3,831,572 | 8/1974 | Csicsery . | |
| 4,034,727 | 7/1977 | Aono | 261/DIG. 67 |
| 4,059,081 | 11/1977 | Kayanuma . | |
| 4,106,464 | 8/1978 | Yamashita | 261/DIG. 67 |
| 4,176,639 | 12/1979 | Shinoda et al. . | |
| 4,193,383 | 3/1980 | Rogers . | |
| 4,212,276 | 7/1980 | Kaneda . | |
| 4,270,504 | 6/1981 | Sciotti | 261/DIG. 67 |
| 4,377,146 | 3/1983 | Oniki | 261/DIG. 67 |
| 4,381,753 | 5/1983 | Yuzawa et al. . | |
| 4,387,062 | 6/1983 | Tanaka | 261/DIG. 67 |
| 4,408,581 | 10/1983 | Pfalzgraf | 123/337 |
| 4,409,940 | 10/1983 | Gaus | 123/337 |
| 4,448,734 | 5/1984 | Shibano | 261/DIG. 67 |
| 4,577,607 | 3/1986 | Nishio | 261/DIG. 67 |
| 4,608,208 | 8/1986 | Yoea | 261/DIG. 67 |
| 5,133,905 | 7/1992 | Woody | 261/DIG. 67 |
| 5,311,849 | 5/1994 | Lambert | 123/377 |
| 5,431,141 | 7/1995 | Kanazawa | 123/337 |
| 5,732,686 | 3/1998 | Yokoyama | 123/517 |
| 5,740,779 | 4/1998 | Spencer-Smith . | |

FOREIGN PATENT DOCUMENTS

| | | | |
|---|---|---|---|
| 1365889 | 9/1974 | United Kingdom | 261/DIG. 67 |

OTHER PUBLICATIONS

Advertising sheet for "SPEEDTRAPP" by Northern California Diagnostic Labs, Inc.

S & S Cycle Catalog, 1997 and earlier, p. 13, "S & S Early Style Carburetor."

*Primary Examiner*—Carl S. Miller
*Attorney, Agent, or Firm*—Foley & Lardner

[57] ABSTRACT

An evaporative emissions control system for carburetors used in the internal combustion engines of vehicles, such as motorcycles, has an evaporative emissions control valve attached to the carburetor in the air intake path to the carburetor. The evaporative emissions control valve may be implemented as a sub-assembly add-on or as an integral part of a carburetor or back plate. The evaporative emissions control valve includes a valve, such as a rotatable plate valve, which may be electrically operated by an electrical actuator, such as a dual-wound solenoid actuator. At engine start-up, when the vehicle ignition switch and starter switch are both closed, both windings of the solenoid actuator are energized to provide a strong opening force for the evaporative emission control valve. During steady-state running of the engine, only a single solenoid winding is energized by the power provided through the ignition switch, to maintain the evaporative emissions control valve in the open position. When the ignition switch is opened and the engine is turned off, the evaporative emissions control valve is closed to prevent the release of fuel vapors from the carburetor. A vacuum controlled switch may be used to delay closing of the evaporative emissions control valve after the ignition is turned off for a sufficient time to prevent fuel pooling in the carburetor. A passage may be provided in a shaft of the control valve to selectively control venting of the carburetor fuel bowl, opening the vent during engine operation while closing the fuel bowl vent to prevent evaporative emissions therefrom when the engine is not in operation.

21 Claims, 8 Drawing Sheets

EVAPORATIVE EMISSIONS CONTROL FOR CARBURETORS

FIELD OF THE INVENTION

This invention pertains generally to internal combustion engines and components thereof, and more particularly to carburetors for internal combustion engines and methods and devices for preventing evaporative emissions from a carburetor when an internal combustion engine is not in operation.

BACKGROUND OF THE INVENTION

Many types of internal combustion engines use a carburetor for supplying the engine with properly atomized and vaporized fuel mixed with air. The air-fuel mixture is fed from the carburetor through an intake manifold to the combustion chambers of the engine. A typical carburetor includes a fuel bowl, which holds a measured amount of fuel from a gas tank. The fuel bowl includes a bowl vent, which allows air into the fuel bowl, and a fuel discharge tube for discharging fuel from the fuel bowl into a venturi section of the carburetor. In the venturi section air, which is drawn into the carburetor typically through an air filter or cleaner, is mixed with the fuel discharged from the fuel bowl. A throttle valve, located in the carburetor downstream from the venturi section thereof, controls the amount of air-fuel mixture entering the engine's combustion chambers.

When an internal combustion engine is not in operation, fuel vapors due to evaporation of the fuel in the fuel bowl and other parts of the carburetor or in the engine, can escape to the atmosphere through the bowl vent and/or through the carburetor air intake path. These hydrocarbon vapors, along with emissions of combustion products through the exhaust systems of internal combustion engines, can contribute to air pollution. As a result, many states, most notably California, have adopted evaporative emissions standards for internal combustion engine-powered vehicles, such as automobiles and motorcycles.

Various systems have been developed for limiting the evaporative emissions of hydrocarbons from the carburetor of an internal combustion engine. Such systems typically employ an air intake gating valve positioned upstream of the carburetor fuel discharge tube, either between the venturi section of the carburetor and the air filter, or between the air filter and the outside atmosphere. When the engine is not in operation, the gating valve is closed to prevent evaporative emissions from the carburetor. When the engine is in operation, the gating valve is opened to allow air to be drawn into the carburetor from the atmosphere. Such gating valves are typically controlled using a vacuum-operated valve controller that is connected in fluid communication with the carburetor, typically downstream of the venturi section of the carburetor, or some other part of the intake system such as the intake manifold, such that when the engine is running a negative pressure is induced as the engine draws air through the carburetor, which opens the valve. Typically, the gating valve is mechanically coupled to a diaphragm in the vacuum-operated valve controller that responds to the negative pressure (below ambient pressure) in the carburetor to open the gating valve. Various mechanisms may be employed to ensure that the gating valve is not closed unintentionally due to transient drops in the volume of air drawn through the carburetor when the engine is in operation. Such air intake volume drops may result in temporary loss of the negative pressure level which is used to hold the gating valve open.

SUMMARY OF THE INVENTION

The present invention provides evaporative emissions control for the carburetors of internal combustion engine powered vehicles, such as motorcycles and automobiles. In accordance with the present invention, an evaporative emissions control valve is connected in the air intake path to the carburetor, preferably between the carburetor and an air filter. The evaporative emissions control valve is controlled to close the air intake path to the carburetor, to thereby prevent evaporative emissions from the carburetor, when an internal combustion engine to which the carburetor is attached is not in operation. The evaporative emissions control valve is controlled to open the air intake path through the carburetor when the internal combustion engine is in operation.

At engine start-up, the evaporative emissions control valve in accordance with the present invention is preferably opened with a first force level. Once the engine has reached its steady state running condition, the evaporative emissions control valve is held open with a second force level. The first force level is greater than the second force level, and is preferably sufficient to prevent inadvertent closing of the evaporative emissions control valve during engine start-up, which may be caused by "spit-backs" through the carburetor during engine start-up. When the engine is not in operation, the evaporative emissions control valve is closed to seal the air intake path and inhibit the escape of gasoline vapors.

The evaporative emissions control valve in accordance with the present invention is preferably electrically operated. A dual-wound solenoid actuator, having a primary winding and an auxiliary winding, is preferably used to provide electrical operation of the evaporative emissions control valve. The primary winding of the solenoid is connected to the vehicle battery via an ignition switch. The ignition switch is closed whenever the engine is running. The auxiliary winding is connected to the vehicle battery via an engine starter switch. The starter switch is closed to supply power to the engine starter during starting of the engine, which simultaneously supplies power to the auxiliary winding. Thus, both the primary and auxiliary windings of the solenoid actuator are energized during engine start-up. The resulting magnetic field formed in the solenoid actuator by the energized primary and auxiliary windings provides a relatively large force to open the evaporative emissions control valve and to hold it in its open position during engine start-up. Once the engine is started and running, the starter switch is opened and the power provided to the starter is removed. Simultaneously, power is removed from the auxiliary winding of the solenoid. However, since the ignition switch remains turned on as long as the engine is in operation, the primary winding of the solenoid actuator is continuously energized after engine start-up. The energized primary winding alone provides enough force to hold the evaporative emissions control valve in the open position during the normal running condition of the engine. This preferred method of operating an evaporative emissions control valve system in accordance with the present invention prevents inadvertent closing of the evaporative emissions control valve which may be caused by "spit-backs" through the carburetor during engine start-up, because by energizing the two solenoid windings extra valve opening force is provided during start-up while the current draw after start-up is minimized, by energizing only one solenoid winding once the engine is started and running.

When the vehicle ignition switch is turned off, the engine is shut down. If the evaporative emissions control valve were to close instantaneously following engine shutdown, fuel might pool in the carburetor. To prevent fuel pooling, a vacuum operated switch or some other electrical or electronic component is used to energize or to delay the deenergizing of one of the solenoid windings to hold the evaporative emissions control valve in the open position for a short period after the engine is turned off, until the vacuum necessary to pull fuel into the carburetor has subsided as the engine coasts to a complete stop.

In certain internal combustion engine carburetor designs, such as those typically found on motorcycles, the carburetor fuel bowl may be vented through a bowl vent having a bowl vent aperture positioned alongside the main carburetor air intake opening. In accordance with the present invention, evaporative emissions from the bowl vent may be controlled by providing a passage in a portion of a shaft upon which the evaporative emissions control valve is mounted. The evaporative emissions control valve may be mounted on the carburetor such that the valve shaft covers the bowl vent aperture. Evaporative emissions from the bowl vent are thus blocked by the valve shaft when the evaporative emissions control valve is closed. The passage in the valve shaft is aligned with the bowl vent aperture such that, when the shaft is moved to open the evaporative emissions control valve during engine operation, the passage in the shaft allows air to enter the bowl vent to ensure proper operation of the fuel bowl during engine operation. The passage may be formed as a notch, slot, hole or other shape in the valve shaft. Other methods of controlling evaporative emissions from the bowl vent may also be used in combination with an evaporative emissions control valve in accordance with the present invention.

Further objects, features, and advantages of the present invention will be apparent from the following detailed description taken in conjunction with the accompanying drawings.

DETAILED DESCRIPTION OF THE INVENTION

An evaporative emissions control system in accordance with the present invention will be described in detail throughout this specification with reference to the exemplary application thereof to an internal combustion engine for a motorcycle. However, it should be understood that evaporative emissions control in accordance with the present invention may be provided to any type of internal combustion engine, for any type of vehicle.

Figure 1:
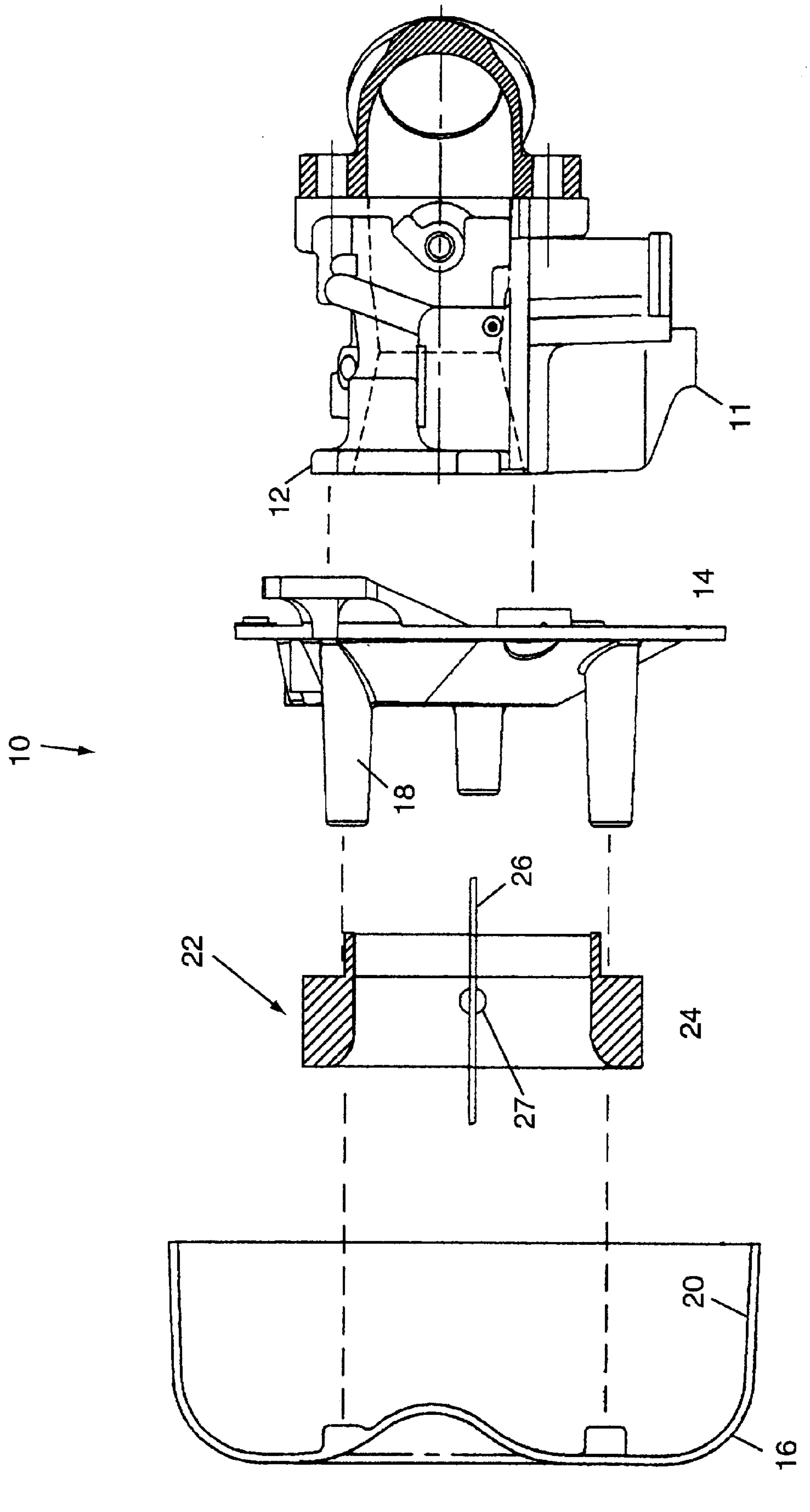
FIG. 1 is an exploded side view, in partial cross-section, of the components of an air intake and carburetor system for an internal combustion engine, including an opened evaporative emissions control valve in accordance with the present invention.
Figure 2:
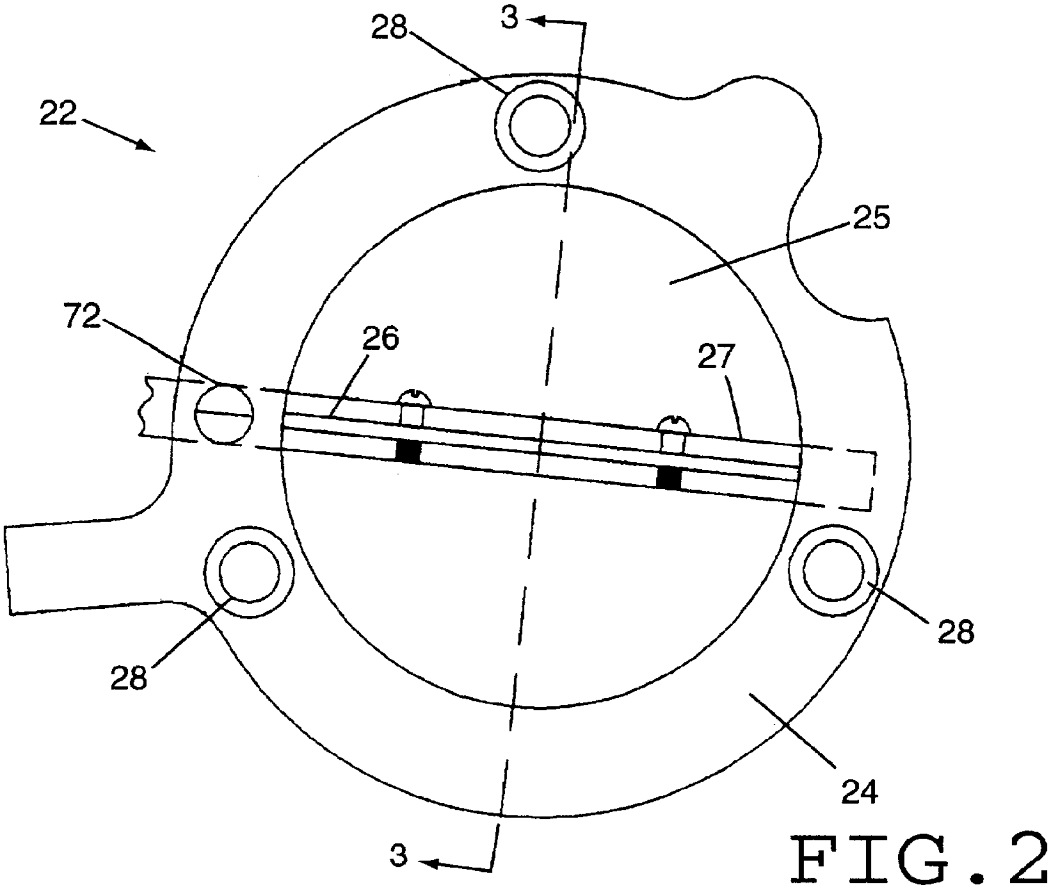
FIG. 2 is a front view of an opened evaporative emissions control valve in accordance with the present invention.
Figure 3:
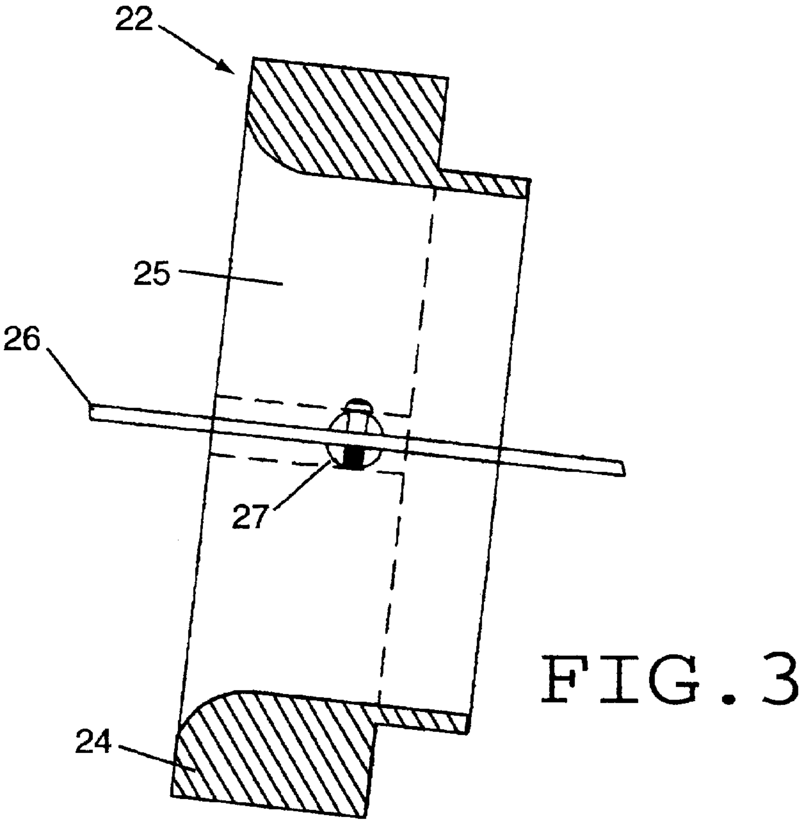
FIG. 3 is a cross-sectional view of the opened evaporative emissions control valve of FIG. 2 taken generally along the lines 3—3 of FIG. 2.
Figure 4:
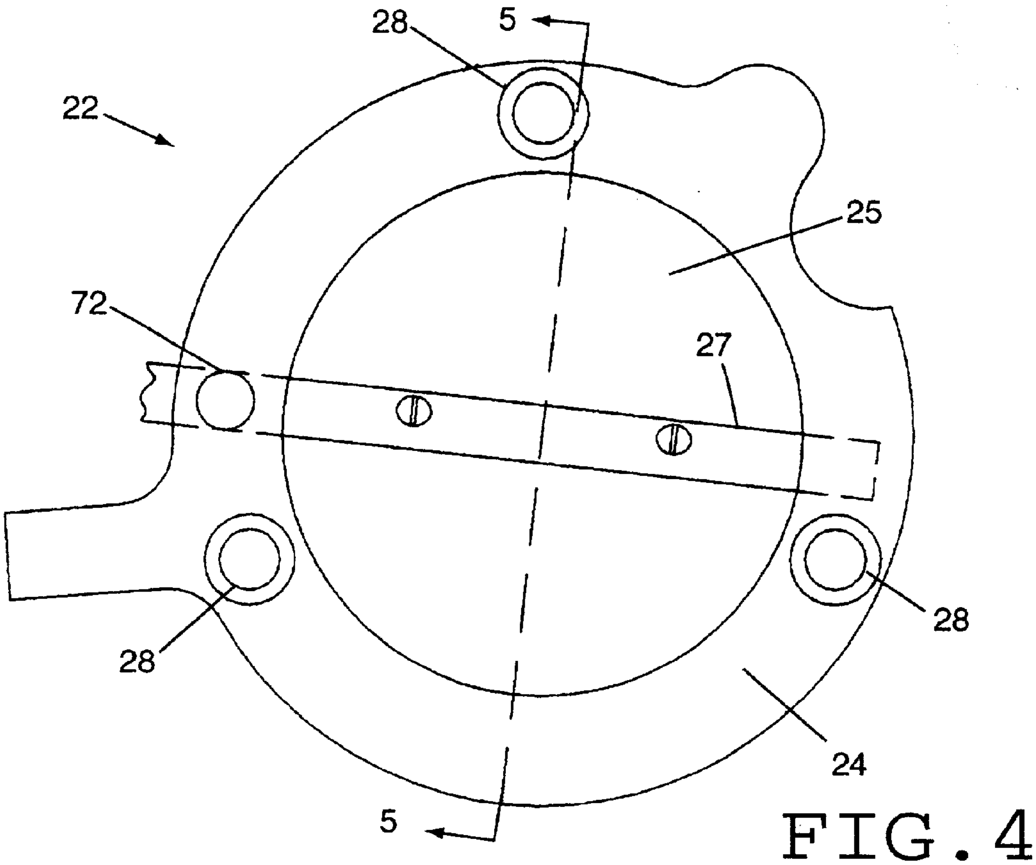
FIG. 4 is a front view of the evaporative emissions control valve of FIG. 2 in a closed position.
Figure 5:
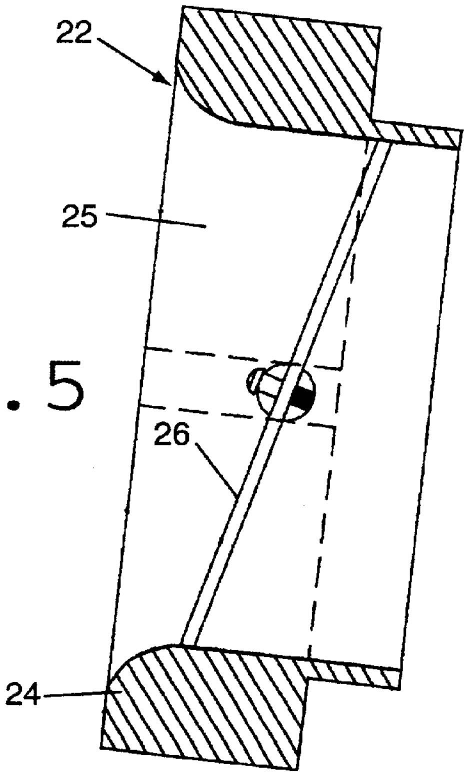
FIG. 5 is a cross-sectional view of the closed evaporative emissions control valve of FIG. 4 taken generally along the line 5—5 of FIG. 4.
Figure 6:
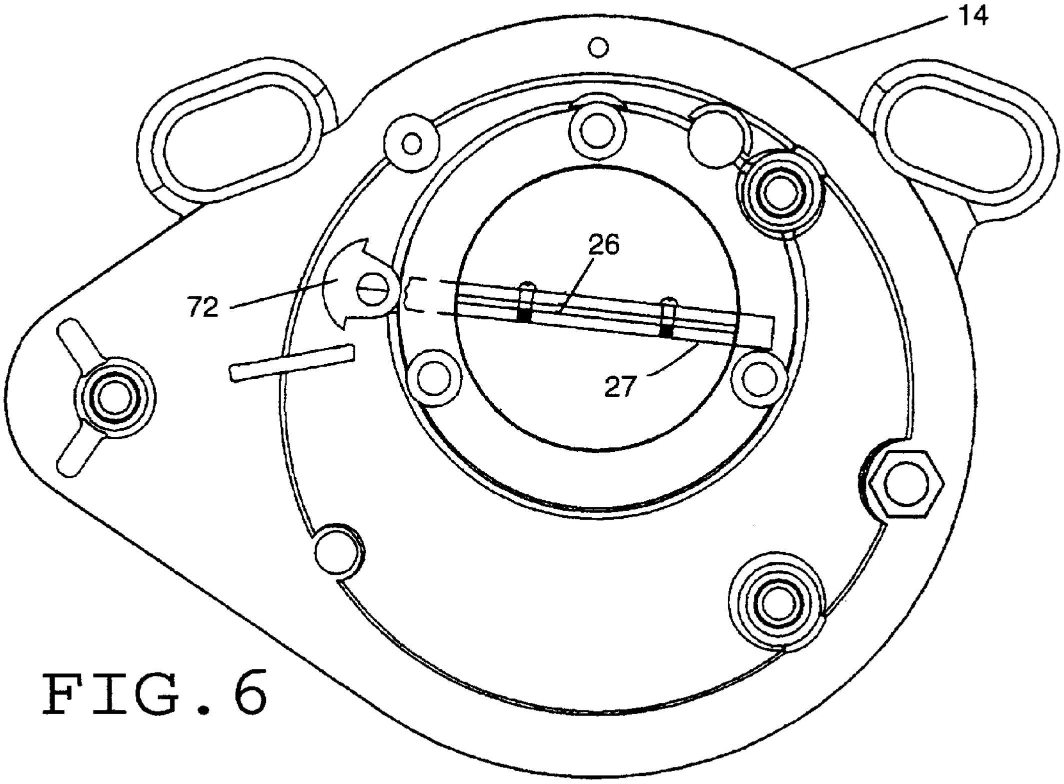
FIG. 6 is a front view of a motorcycle engine carburetor back plate having an evaporative emissions control valve in accordance with the present invention integrally formed as a part thereof.
Figure 7:
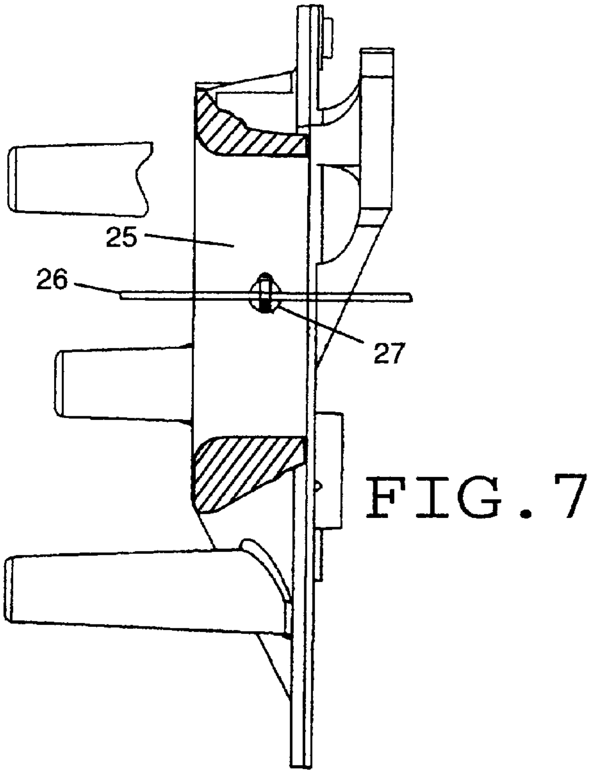
FIG. 7 is a side view, in partial cross-section, of the back plate of FIG. 6.
Figure 8:
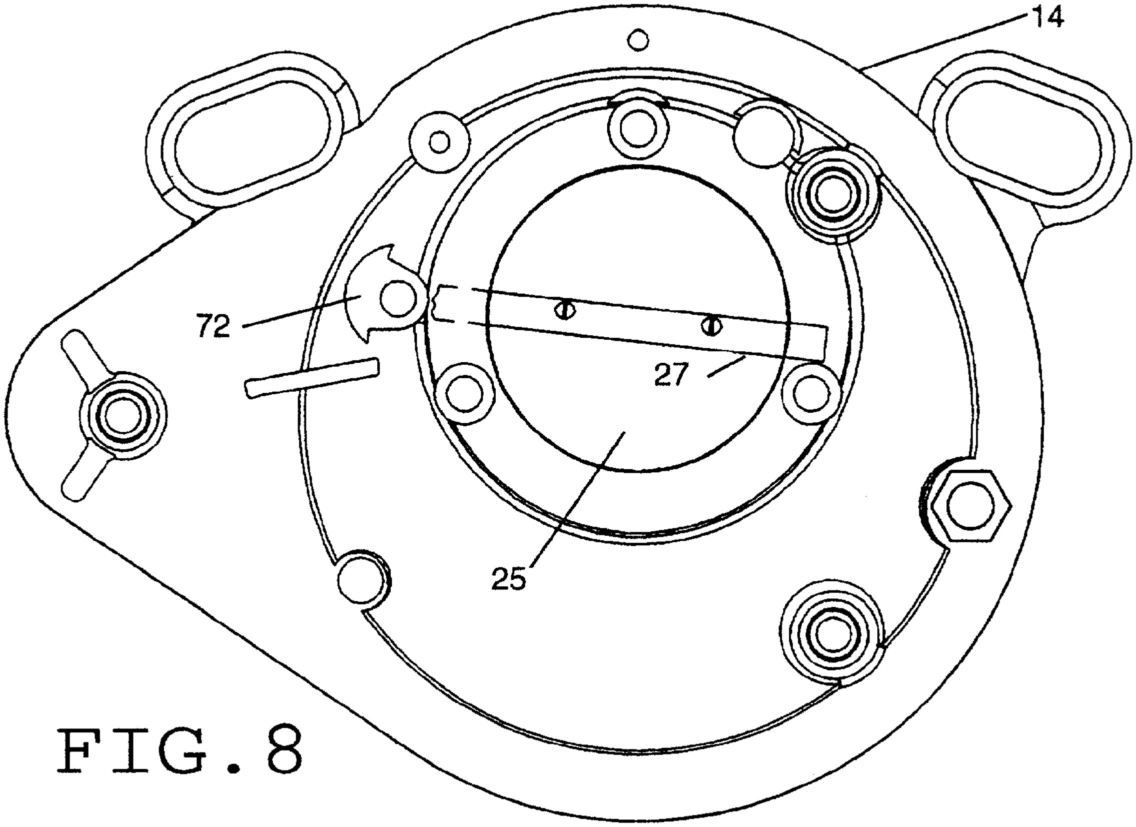
FIG. 8 is a front view of the back plate of FIG. 6 showing the evaporative emissions control valve in a closed position.
Figure 9:
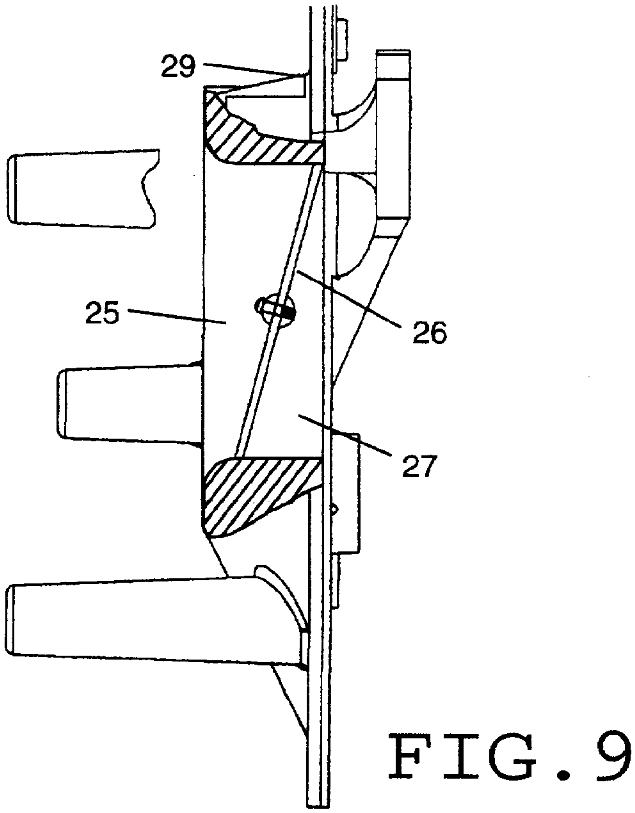
FIG. 9 is a side view, in partial cross-section, of the back plate of FIG. 8.

The components of an air intake system for an internal combustion engine incorporating evaporative emissions control in accordance with the present invention are illustrated generally at 10 in FIG. 1. At the heart of the internal combustion engine intake system 10 is a carburetor 12. The carburetor 12 is typically screwed, or otherwise attached, to the intake manifold of an internal combustion engine (shown in FIG. 1). The carburetor 12 may be of a conventional design, and may include such conventional components as a fuel bowl 11, containing a measured amount of fuel from a fuel tank, a fuel discharge tube for discharging fuel from the fuel bowl into the carburetor, a venturi section of the carburetor wherein fuel from the fuel bowl is mixed with air drawn into the carburetor, and a throttle valve for adjusting the amount of air-fuel mixture entering the engine through the intake manifold. Because the evaporative emissions control in accordance with the present invention may be employed in combination with any carburetor design, and since carburetor designs are well-known to those skilled in the art, the carburetor 12 will not be described in further detail herein. For illustration, for a carburetor for use with a motorcycle engine, a back plate 14 is screwed, or otherwise mounted, to the carburetor 12 to provide an interface between the carburetor 12 and an air filter cover 16. The air filter cover 16 may, for example, be screwed, or otherwise attached to protruding portions 18 of the back plate 14. An air filter, not shown in FIG. 1, is typically placed within the air filter cover 16 inside the inner peripheral wall 20 thereof. When the air filter cover 16 is attached to the back plate 14, the air filter lies between the protruding portions 18 of the back plate 14 and the inner peripheral wall 20 of the filter cover 16. In operation, air is drawn inside the air filter cover 16 near the peripheral wall 20 thereof, and thus through the air filter placed therein. The drawn air then passes through a central aperture in the back plate 14 into the carburetor 12 where the air is mixed with fuel discharged into the venturi section of the carburetor from the carburetor fuel bowl 11.

When the engine is not in operation, fuel vapor may escape from the carburetor, through the central aperture in the back plate 14 and then through the air filter, to the atmosphere, contributing to air pollution. In accordance with the present invention, an evaporative emissions control valve assembly 22 is installed in the intake system 10 to prevent such evaporative emissions. The evaporative emissions control valve assembly 22 is preferably positioned in the intake system 10 in the air intake path between the back plate 14 and the air filter cover 16.

An exemplary evaporative emissions control valve assembly 22 in accordance with the present invention is described in more detail with reference to FIGS. 2–5. The evaporative emissions control valve assembly 22 preferably includes a valve housing 24, having a central aperture 25 in which is mounted a valve flap or plate 26. As illustrated in FIGS. 2–5, the evaporative emissions control valve assembly 22 may be implemented as a butterfly type valve assembly, wherein the plate 26 is formed as a flat disc mounted on a rotating shaft 27. However, it should be apparent that other types of valve assemblies may also be used to implement an evaporative emissions control valve assembly in accordance with the present invention, including those wherein the valve plate is mounted on a sliding shaft.

To assemble the evaporative emissions control valve assembly 22 in the intake system 10, the valve housing 24 is preferably screwed, or otherwise mounted on the back plate 14, before the air filter cover 16 is attached to the back plate 14. Mounting holes 28 may be provided in the valve housing 24 for this purpose. For a typical motorcycle engine, the evaporative emissions control valve assembly 22 may be bolted to the back plate 14 using the three back plate mounting holes provided.

An evaporative emissions control valve assembly 22 in accordance with the present invention may be implemented as a separate subassembly, as illustrated in FIGS. 2–5, which may then be mounted in a new engine, or retrofitted as an add-on to an existing internal combustion induction system. Alternatively, the evaporative emissions control valve in accordance with the present invention may be implemented as an integral part of another component of the air intake system 10, such as the back plate 14 or the carburetor 12, which may be either retrofitted into an existing engine or factory installed. An exemplary evaporative emissions control valve in accordance with the present invention which is integrally formed as part of a motorcycle engine carburetor back plate 14 is illustrated in FIGS. 6–9. The components of the evaporative emissions control valve illustrated in FIGS. 6–9 operate in the same manner as the corresponding parts in FIGS. 2–5, and are thus labeled with the same reference numerals as are used in FIGS. 2–5.

The evaporative emissions control system in accordance with the present invention operates generally as follows. When the internal combustion engine to which the carburetor 12 is attached is in operation, the valve plate 26 is opened (rotated by the shaft 27 to the position shown in FIGS. 2, 3, 6 and 7). This allows air to enter the carburetor on an air intake path from the outside, through the air filter cover 16, the opened evaporative emissions control valve central aperture 25, and the central aperture of the back plate 14. When the engine is turned off, the valve plate 26 is closed (to the position shown in FIGS. 4, 5, 8, and 9). The closing of the evaporative emissions control valve plate 26 closes off the central aperture 25 of the control valve, thereby preventing evaporating fuel (hydrocarbons) from escaping from the carburetor to the outside atmosphere, and thus preventing undesirable evaporative emissions air pollution.

In accordance with the present invention, an evaporative emissions control valve is controlled to open with a first, relatively high, force level during engine start-up, and is held open during steady state running of the engine by a second, lower, force level. An exemplary evaporative emissions control valve assembly 22, including an exemplary electrically operated valve controller for opening and closing the control valve in accordance with the present invention, will now be described in more detail with reference to FIG. 10.

Figure 10:
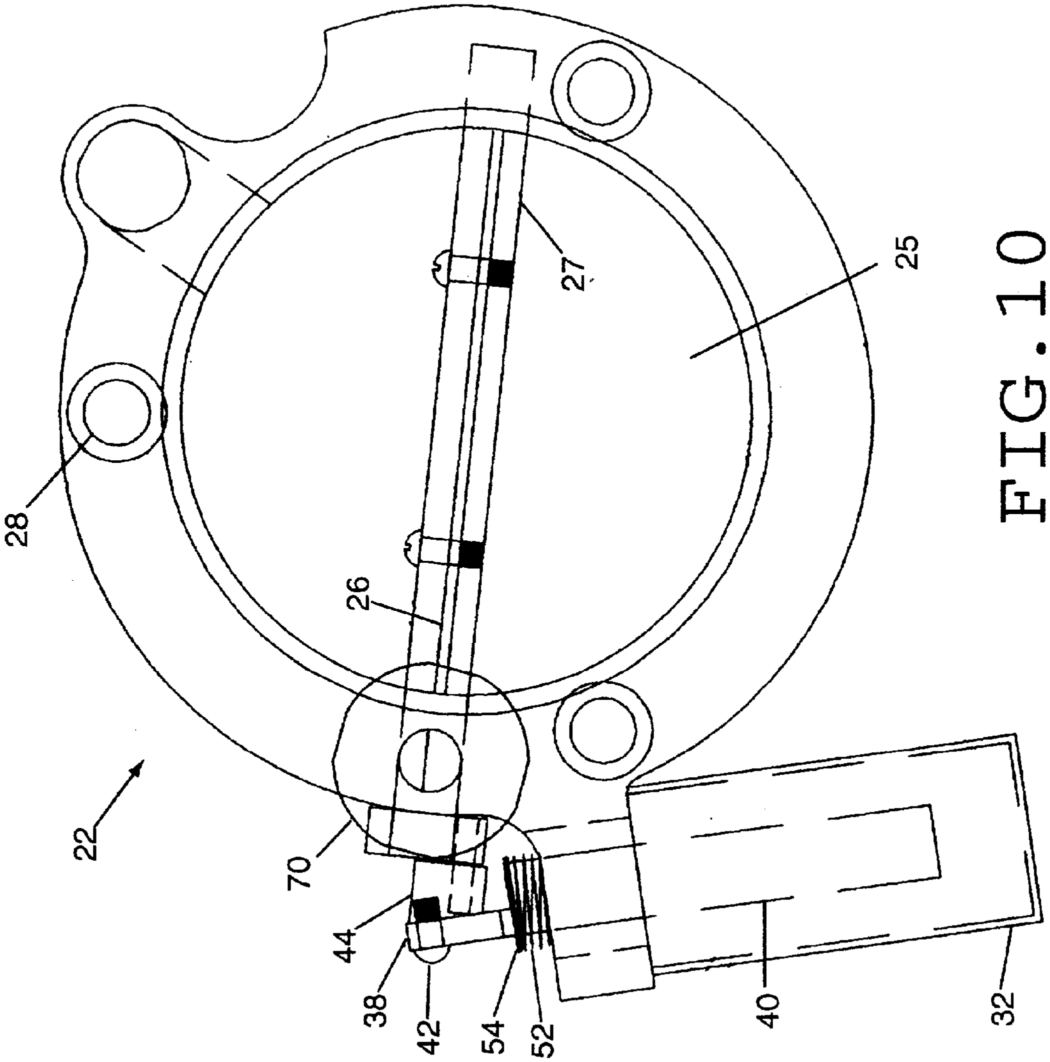
FIG. 10 is a front view of an evaporative emissions control valve in accordance with the present invention with a solenoid actuator connected to the valve for operating the valve.

In accordance with the present invention, the valve plate 26 of the control valve assembly 22 is preferably operated (i.e., opened and closed) electrically, for example, by a solenoid actuator 32. The solenoid actuator 32 includes a protruding portion 38 of a solenoid shaft 40, which extends from the end of the solenoid actuator 32. The protruding portion 38 of the solenoid shaft 40 may be attached (e.g., by a bolt 42 or other connector) to a valve operating mechanism 44. The valve operating mechanism 44 (e.g., a crank plate fixed to the shaft 27 with the bolt 42 pivotally connecting the shaft 40 to the crank plate off the axis of rotation of the shaft 27) operatively connects the solenoid shaft 40 to the valve shaft 27 such that when the solenoid shaft 40 is fully extended from the solenoid actuator 32 the valve shaft 27 is rotated to close the valve plate 26, thereby closing off the central aperture 25 of the valve assembly 22. When the solenoid shaft 40 is pulled into the solenoid actuator 32, as illustrated in FIG. 10, and as will be described in more detail below, the valve shaft 27 is rotated by the valve operating mechanism 44 to open the valve plate 26. The solenoid actuator 32 is controlled to open the valve plate 26 when an engine is in operation to allow air to enter the carburetor 12. When the engine is turned off, however, the solenoid actuator 32 is controlled to close the valve plate 26 to prevent evaporative emissions from escaping from the carburetor 12 to the outside environment.

The solenoid actuator 32, and the control thereof to provide evaporative emissions control in accordance with the present invention, will be described in more detail with reference to FIG. 11. In accordance with the present invention, a dual-wound solenoid actuator 32 is preferably used. The dual-wound solenoid actuator 32 preferably includes a primary winding 46 and an auxiliary winding 48 wrapped around the solenoid shaft 40. The primary winding 46 and auxiliary winding 48 may be positioned in any sequence along the solenoid shaft 42, or may be intertwined. The primary winding 46 and auxiliary winding 48 are, however, preferably electrically isolated from each other. Each of the windings 46 and 48 is connected at one terminal thereof to ground by a line 49. The solenoid shaft 40 protrudes from the solenoid actuator 32. A spring 52 is preferably positioned around the protruding portion 38 of the solenoid shaft 40 and is operationally connected to the solenoid shaft 40, such as by a biasing plate 54, to be under compression to spring bias the shaft 40 outwardly such that when no electrical signal (e.g., 12 volt DC power) is provided to either of the windings 46 and 48, the spring 52 extends the solenoid shaft 40 outwardly to its fully extended position in the direction indicated by the arrow 55. In this fully extended direction 55, the valve plate 26, to which the protruding portion 38 of the solenoid shaft 40 is attached via the valve operating mechanism 44 and the valve shaft 27, is closed, as discussed previously. When an electrical signal is provided to the other terminal of either one or both of the primary winding 46 or the auxiliary winding 48 of the solenoid actuator 32, a magnetic field is generated within the solenoid actuator 32 which pulls the solenoid shaft 40 downward, in the direction indicated by the arrow labeled 56, against the biasing action of the spring 52. This downward force causes the valve plate 26 to open. When the electrical signal is removed from the windings 46 and 48, the magnetic field disappears, and the force applied by the biasing spring 52 extends the solenoid shaft 40 in the direction of the arrow 55, thereby reclosing the valve plate 26.

In accordance with the present invention, the windings 46 and 48 of the dual-wound solenoid actuator 32 are both energized to provide maximum valve opening force during engine start-up, while eliminating unnecessary current draw by the solenoid actuator 32 once the engine has achieved a steady state running condition.

Figure 11:
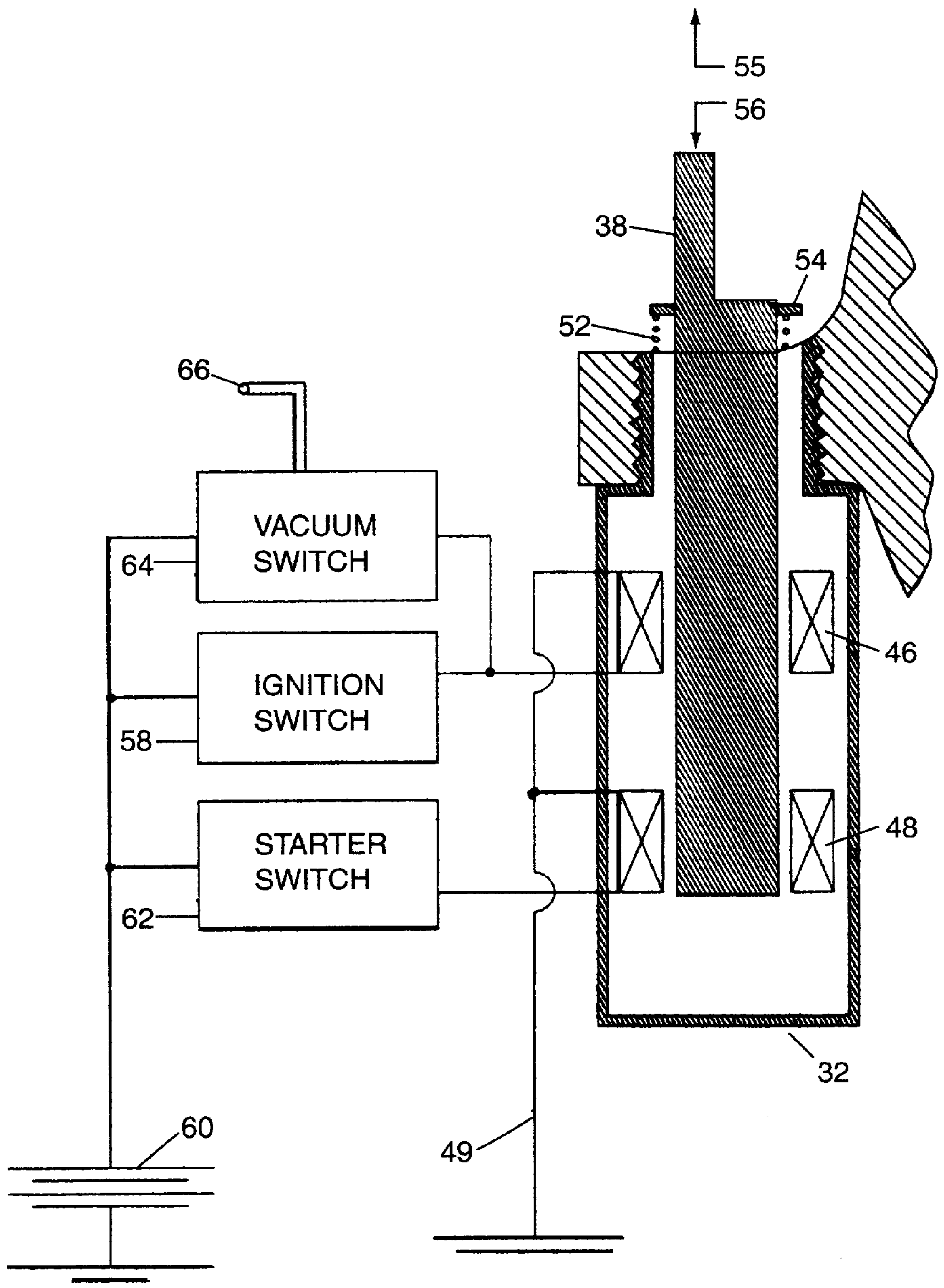
FIG. 11 is a schematic illustration of a dual-wound solenoid actuator and the electrical connections therefor for controlling the operation of an evaporative emissions control valve in accordance with the present invention.

Exemplary preferred electrical connections for the primary winding 46 and auxiliary winding 48 are schematically illustrated in FIG. 11. An ignition switch 58 is connected between the vehicle battery 60 and the primary winding 46 of the dual-wound solenoid actuator 32. The ignition switch 58 closes to connect the primary winding 46 (as well as other vehicle electrical components not shown in FIG. 11) to the battery 60 when the vehicle ignition is turned on. A starter switch 62 is connected between the battery 60 and the auxiliary winding 48 of the solenoid 32. The starter switch 62 is closed by the operator during engine start up to provide power from the battery 60 to the auxiliary winding 48 at the same time that the engine starter is energized to turn over the engine at engine start-up (typically with the starter switch 62 connected to a starter relay not shown in FIG. 11).

With both the primary winding 46 and auxiliary winding 48 of the solenoid actuator 32 energized during start-up, a relatively strong magnetic force is generated within the solenoid actuator 32 to pull the solenoid shaft 40 in the direction 56, to thereby open the valve plate 26. The strong opening force provided under start-up conditions keeps the valve plate 26 open with enough force to withstand "spit backs" through the intake system 10, which are often associated with the start-up of motorcycle engines. After the engine is started, and has reached the steady state running condition, the starter switch 62 is opened by the operator, removing the electrical power which was applied to the auxiliary winding 48 of the solenoid actuator 32. However, as long as the engine is running, the ignition switch 58 will be closed and power will be provided to the primary winding 46 of the solenoid 32. The power provided to the primary winding 46 will provide a magnetic force on the solenoid shaft 40 that is sufficient to hold the valve plate 26 in the open position against the biasing force of the spring 52 during the steady state running condition of the motor, while minimizing the current drawn by the solenoid actuator 32.

When the engine is turned off, the ignition switch 58 is opened, and power is removed from the primary winding 46 of the solenoid actuator 32. This would allow the valve plate 26 to close immediately upon the turn-off of the engine because of the force of the biasing spring 52. However, instantaneous closing of the valve plate 26 after engine shut-down might cause undesirable fuel pooling in the carburetor 12. Therefore, in accordance with the present invention, the closing of the valve plate 26 after the engine is turned off is preferably delayed for a short period, until the vacuum necessary to pull fuel into the carburetor has subsided and the engine has coasted to a stop, to prevent such fuel pooling. In accordance with the present invention, delayed closing of the valve plate 26 after engine turn-off is achieved using a vacuum operated switch 64. The vacuum operated switch 64 is preferably connected between the vehicle battery 60 and the primary winding 46 of the solenoid actuator 32 in parallel with the ignition switch 58. The vacuum operated switch 64 may be implemented in a conventional manner. A conduit 66, extending from the vacuum operated switch 64, connects the vacuum operated switch 64 in fluid communication with a section of the engine wherein a negative air pressure is generated when the engine is in operation. For example, the conduit 66 may be used to connect the vacuum operated switch 64 in fluid communication with the intake system 10 at a location in the carburetor 12 downstream of the throttle valve. When the engine is in operation, the lower than atmospheric pressure provided to the vacuum operated switch 64 via the conduit 66 operates, for example, on a diaphragm located therein, to close electrical contacts in the vacuum switch 64. Thus, when the engine is running, the primary winding 46 of the solenoid actuator 32 is electrically connected to the system battery 60 via both the ignition switch 58 and the vacuum operated switch 64. When the engine is turned off when the operator opens the ignition switch 58, the electrical connection of the primary winding 46 to the vehicle battery 60 through the ignition switch 58 is broken. However, as long as there is enough negative pressure to pull fuel into the carburetor, the vacuum operated switch 64 will remain closed, thereby energizing the primary winding to keep the valve plate 26 opened. Gradually, the lower than atmospheric pressure downstream of the carburetor subsides as the engine coasts to a stop, and the diaphragm in the vacuum operated switch 64 returns to its normal state to thereby open the vacuum operated switch contacts to remove the electrical connection to the primary winding 46 through the switch 64.

It should be noted that various other valve operating and control devices may be used to implement an is evaporative emissions control system in accordance with the present invention. Such systems may include solenoid devices other than the dual-wound solenoid actuator 32 described herein, solenoid actuators having other electrical connections than those described herein, or other electrical actuators such as motors and electrical rotary actuators. Such valve operating and control devices may be employed with evaporative emissions control systems implemented as separate subassemblies (e.g., as illustrated in FIGS. 2–5) or implemented as integral parts of other components of an engine intake system (e.g., as illustrated in FIGS. 6–9). It is preferred that the force applied by such actuators to open the evaporative emissions control valve at engine start-up be stronger than the force used to maintain the valve opened during steady state running of the engine.

Note that if a solenoid having the electrical connections described herein is used to control an evaporative emissions control valve is mounted on a typical motorcycle engine, the solenoid wire harness may be connected to the stock three pin (ignition, starter, ground) connector located under the motorcycle fuel tank. The vacuum switch 64 may be connected directly to the system battery to provide a 12 volt override to the solenoid actuator 32 for a short time after the ignition switch is turned off, as described previously. Of course, the exact electrical connections required for operation of the solenoid actuator 32 will depend on the vehicle on which the evaporative emission control system of the present invention is employed, and is in no way limited to that illustrated in FIG. 11, or as described with reference to motorcycle engines, for example.

In most cases, the carburetor fuel bowl 11 must be vented to the atmosphere while the engine is running to ensure that a proper air-fuel mixture is provided to the engine. However, when the engine is not in operation, the fuel bowl vent should be closed to prevent evaporation of fuel from the fuel bowl to the atmosphere. In certain well-known motorcycle carburetor designs, the fuel bowl vent opening is positioned alongside the main air intake opening into the carburetor 12. For these carburetor designs, an evaporative emissions control valve assembly 22 in accordance with the present invention may be especially adapted and positioned to provide for venting of the fuel bowl 11 when the engine is in operation, while closing the fuel bowl vent, to prevent evaporative emissions therefrom, when the engine is shut off.

Figure 12:
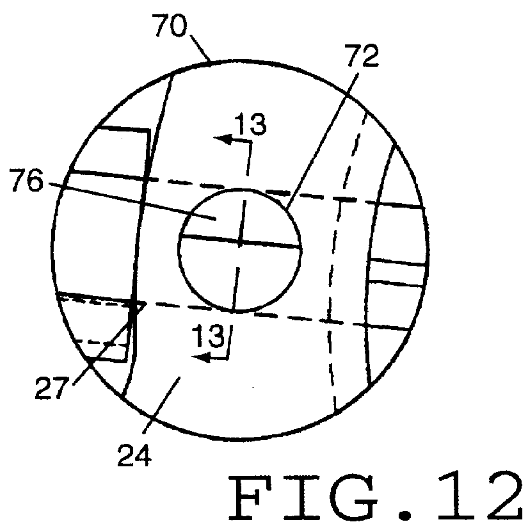
FIG. 12 is a more detailed view of the carburetor bowl vent showing the position of the passage and a valve shaft of an open evaporative emissions control valve in accordance with the present invention.
Figure 13:
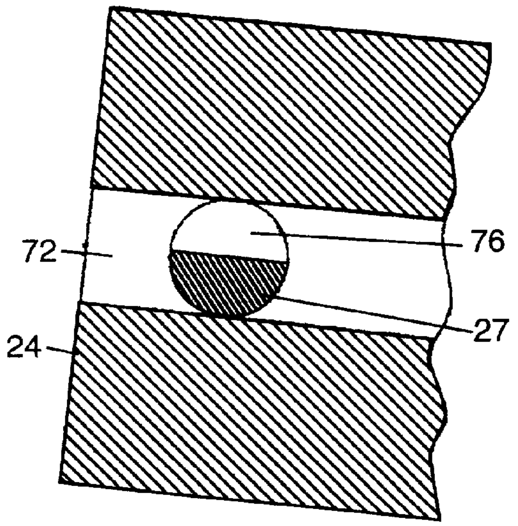
FIG. 13 is a more detailed cross-sectional view of the bowl vent and the shaft of the open evaporative emissions control valve of FIG. 12, as taken generally along the line 13—13 of FIG. 12.
Figure 14:
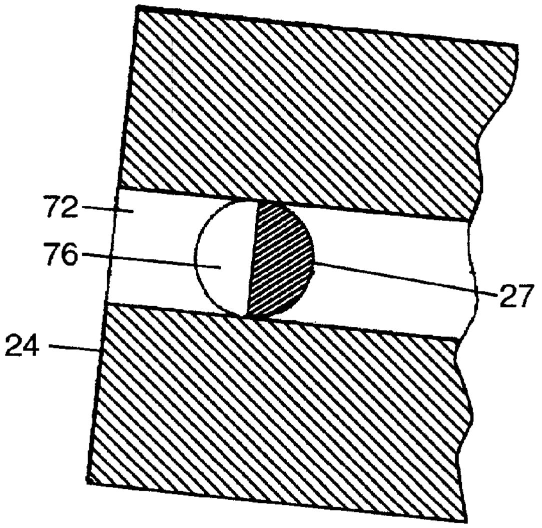
FIG. 14 is a cross-sectional view corresponding to FIG. 13 but showing the shaft of the evaporative emissions control valve in its closed position.

An embodiment of the evaporative emissions control valve assembly 22 of the present invention that provides control of evaporative emissions from the fuel bowl vent is illustrated in, and will be described with reference to, FIGS. 12–14. FIG. 12 is an expanded view showing in detail a portion 70 of the exemplary evaporative emissions control valve assembly 22 shown in FIG. 10. FIG. 13 is a cross-sectional view taken generally along the line 13—13 of FIG. 12. In accordance with the present invention, an aperture 72 is provided in the valve housing 24 of the evaporative emissions control valve assembly 22. (This aperture 72, along with the entire feature now being described, is also illustrated in FIGS. 2, 4, 6 and 8.) The aperture 72 is positioned on the valve housing 24 such that the shaft 27 supporting the valve plate 26 passes through the aperture 72 along a diameter thereof. The evaporative emissions control valve housing 24 is, in turn, mounted on the back plate 14 such that the aperture 72 is aligned with the carburetor fuel bowl vent. A passage 76 is provided in the shaft 27, which is otherwise generally cylindrical in shape, in the area of the aperture 72. The passage 76 in the shaft 27 may be formed as a notched section of the shaft 27, as illustrated in FIG. 13. The notch may have any shape, such as a half-moon, etc. Alternatively, a slot, hole, or other similar passage through the shaft 27, may be formed. When the valve plate 26 is opened, as illustrated in FIGS. 12 and 13, the passage 76 in the shaft 27 allows air to pass through the aperture 72, thereby allowing venting of the carburetor fuel bowl 11 to ensure the providing of a proper air-fuel mixture to the running engine. However, when the valve plate 26 is closed, when the engine is no longer in operation, the shaft 27 is rotated to the position illustrated in FIG. 14, with the passage 76 out of alignment with the aperture 72 so that the rest of the shaft closes the aperture 72, and prevents evaporative emissions of fuel vapors from the carburetor fuel bowl vent. Thus, in accordance with the present invention, evaporative emissions control of carburetor emissions, from both the main carburetor air channel and the fuel bowl vent, may be provided by the actuation of a single control valve. Separate evaporative emissions control valves are not needed. Note that this feature may also be provided in combination with other types of evaporative emissions control valves, such as those which employ sliding, rather than rotating, valve shafts.

It should be understood that this invention is not limited to the particular embodiments herein illustrated and described, but embraces all such modified forms thereof as come within the scope of the following claims.

What is claimed is:

1. An evaporative emissions control system for controlling the emissions of fuel vapors from the carburetor of an internal combustion engine, comprising:

(a) an evaporative emissions control valve adapted to be connected in the air intake path to a carburetor such that when the evaporative emissions control valve is open air is allowed into the carburetor and when the evaporative emissions control valve is closed fuel vapor is prevented from escaping from the carburetor;

(b) an electrical actuator connected to the evaporative emissions control valve and responsive to first and second control signals to open the evaporative emissions control valve, wherein the electrical actuator opens the evaporative emissions control valve with a first force level when the first control signal is provided to the electrical actuator, the electrical actuator opens the evaporative emissions control valve with a second force level when both the first and second control signals are provided to the electrical actuator, and wherein the second force level is greater than the first force level.

2. The evaporative emissions control system of claim 1 including an ignition switch connected to a battery and to the electrical actuator to provide the first control signal to the actuator when the ignition switch is turned on; and a starter switch connected to a battery and to the electrical actuator to provide the second control signal to the electrical actuator when the starter switch is closed and a starter of the internal combustion engine is energized.

3. The evaporative emissions control system of claim 1 wherein the evaporative emissions control valve has a rotating plate in the air intake path to the carburetor that is connected to the electrical actuator to be rotated between a closed and an open position.

4. The evaporative emissions control system of claim 2 wherein the electrical actuator is a dual-wound solenoid actuator having a primary winding and an auxiliary winding, wherein the ignition switch is connected to the primary winding to energize the primary winding when the ignition switch is turned on, and wherein the starter switch is connected to the auxiliary winding to energize the auxiliary winding when a starter of the internal combustion engine is energized by closing the starter switch.

5. The evaporative emissions control system of claim 1 comprising additionally a vacuum controlled switching means for providing a third control signal to the electrical actuator to hold open the evaporative emissions control valve whenever the vacuum draw generated by the engine in the carburetor is below a selected pressure level less than ambient pressure.

6. The evaporative emissions control system of claim 1 wherein the evaporative emissions control valve includes a valve plate mounted on a valve shaft in the air intake path to the carburetor, and wherein the valve shaft has a passage therein which is adapted to be aligned with an aperture of a fuel bowl vent such that the fuel bowl vent aperture is closed by the valve shaft to prevent fuel vapor from escaping from the fuel bowl when the evaporative emissions control valve is closed, and the fuel bowl vent aperture is opened by the passage in the valve shaft to allow air to enter the fuel bowl to equalize fuel bowl pressure to ambient pressure when the evaporative emissions control valve is opened.

7. The evaporative emissions control system of claim 6 wherein the passage in the valve shaft is a notch formed partially through the valve shaft.

8. The evaporative emissions control system of claim 1 wherein the evaporative emissions control valve is formed integrally with a carburetor back plate.

9. An evaporative emissions control system for controlling the emissions of fuel vapors from the carburetor of an internal combustion engine, comprising:

(a) an evaporative emissions control valve adapted to be connected in the air intake path to a carburetor such that when the evaporative emissions control valve is opened air is allowed into the carburetor and when the evaporative emissions control valve is closed fuel vapor is prevented from escaping from the carburetor;

(b) a dual-wound solenoid actuator connected to the evaporative emissions control valve and having a primary winding and an auxiliary winding responsive respectively to first and second control signals to open the evaporative emissions control valve, wherein the solenoid actuator opens the evaporative emissions control valve with a first force level when the first control signal is provided to the primary winding, the solenoid actuator opens the evaporative emissions control valve with a second force level when the first control signal is provided to the primary winding and the second control signal is provided to the auxiliary winding, and wherein the second force level is greater than the first force level;

(c) an ignition switch connected to a battery and to the primary winding of the solenoid actuator to provide the first control signal to the primary winding whenever the ignition switch is turned on;

(d) a starter switch connected to a battery and to the auxiliary winding of the solenoid actuator to provide the second control signal to the auxiliary winding when the starter switch is closed to energize the starter of the internal combustion engine; and (e) vacuum controlled switching means for providing a third control signal to the primary winding to hold open the evaporative emissions control valve whenever the vacuum draw generated by the engine in the carburetor is below a selected pressure level less than ambient pressure.

10. The evaporative emissions control system of claim 9 wherein the evaporative emissions control valve has a rotating plate in the air intake path to the carburetor that is connected to the electrical actuator to be rotated from a closed to an open position.

11. The evaporative emissions control system of claim 9 wherein the emission control valve includes a valve plate mounted on a rotatable valve shaft in the air intake path, and wherein the valve shaft has a passage therein which is adapted to be aligned with an aperture of a fuel bowl vent such that the fuel bowl vent aperture is closed by the valve shaft to prevent fuel vapor from escaping from the fuel bowl when the evaporative emissions control valve is closed, and the fuel bowl vent aperture is opened by the passage in the valve shaft to allow air to enter the fuel bowl to equalize fuel bowl pressure to ambient pressure when the evaporative emissions control valve is opened.

12. The evaporative emissions control system of claim 11 wherein the passage in the valve shaft is a notch formed partially through the valve shaft.

13. A method for controlling the emission of fuel vapors from the carburetor of an internal combustion engine, comprising the steps of:

(a) attaching an evaporative emissions control valve to the carburetor such that when the evaporative emissions control valve is opened air is allowed into the carburetor and when the evaporative emissions control valve is closed fuel vapor is prevented from escaping from the carburetor;

(b) opening the evaporative emissions control valve with a first force level when the engine is in a steady state running condition;

(c) opening the evaporative emissions control valve with a second force level when the engine is being started, wherein the second force level is greater than the first force level; and (d) closing the evaporative emissions control valve when the engine is not in operation.

14. The method of claim 13 comprising additionally the step of connecting a dual-wound solenoid actuator having a primary winding and an auxiliary winding to the evaporative emissions control valve to open the evaporative emissions control valve, wherein the step of opening the evaporative emissions control valve with a first force level includes the step of energizing the primary winding when an ignition switch of the internal combustion engine is turned on, and wherein the step of opening the evaporative emissions control valve with a second force level includes the step of energizing the auxiliary winding and the primary winding when a starter of the internal combustion engine is energized.

15. The method of claim 13 comprising additionally the step of delaying the closing of the evaporative emissions control valve after the engine is turned off until the vacuum draw from the engine on the carburetor has subsided.

16. An evaporative emissions control valve for controlling the emission of fuel vapors from the carburetor of an internal combustion engine, comprising:

(a) an evaporative emissions control valve having a valve shaft and adapted to be connected in the air intake path to the carburetor such that when the evaporative emissions control valve is open air is allowed into the carburetor and when the evaporative emissions control valve is closed fuel vapor is prevented from escaping from the carburetor;

(b) an evaporative emissions control valve controller means connected to the valve shaft for opening the evaporative emissions control valve when the internal combustion engine is running and closing the evaporative emissions control valve when the internal combustion engine is not running; and (c) an aperture of a fuel bowl vent of the carburetor and a passage in the valve shaft adapted to be aligned with the aperture of the fuel bowl vent such that the fuel bowl vent aperture is closed by the valve shaft to prevent fuel vapor from escaping from the fuel bowl when the evaporative emissions control valve is closed and the fuel bowl vent aperture is opened by the passage in the valve shaft to allow air to enter the fuel bowl when the evaporative emissions control valve is opened.

17. The evaporative emissions control valve of claim 16 wherein the passage formed in the valve shaft is a notch formed partially through the valve shaft.

18. The evaporative emissions control valve of claim 16 wherein the evaporative emissions control valve controller means includes:

(a) a solenoid actuator connected to the valve shaft and responsive to first and second control signals to open the evaporative emissions control valve, wherein the solenoid actuator opens the evaporative emissions control valve with a first force level when the first control signal is provided to the solenoid actuator, the solenoid actuator opens the evaporative emissions control valve with a second force level when both the first and second control signals are provided to the solenoid actuator, and wherein the second force level is greater than the first force level;

(b) an ignition switch connected to a battery and to the solenoid actuator to provide the first control signal to the solenoid actuator whenever an ignition switch of the internal combustion engine is turned on; and (c) a starter switch connected to a battery and to the solenoid actuator to provide the second control signal to the solenoid actuator when a starter of the internal combustion engine is energized by closing the starter switch.

19. The evaporative emissions control system of claim 18 wherein the electrical actuator is a dual-wound solenoid actuator having a primary winding and an auxiliary winding, wherein the ignition switch is connected to the primary winding to energize the primary winding when the ignition switch is turned on, and wherein the starter switch is connected to the auxiliary winding to energize the auxiliary winding when a starter of the internal combustion engine is energized by closing the starter switch.

20. The evaporative emissions control system of claim 18 comprising additionally a vacuum controlled switching means for providing a third control signal to the electrical actuator to hold open the evaporative emissions control valve whenever the vacuum draw generated by the engine in the carburetor is below a selected pressure level less than ambient pressure.

21. The evaporative emissions control valve of claim 18 wherein the evaporative emissions control valve includes a valve plate mounted on the valve shaft and wherein the valve shaft is a rotatable valve shaft.

* * * * *